(12) United States Patent
Clement et al.

(10) Patent No.: US 11,972,232 B2
(45) Date of Patent: Apr. 30, 2024

(54) NEURAL METHOD COMPLETION BASED ON NATURAL LANGUAGE AND SOURCE CODE

(71) Applicant: MICROSOFT TECHNOLOGY LICENSING, LLC., Redmond, WA (US)

(72) Inventors: Colin Bruce Clement, Seattle, WA (US); Dawn Drain, Bellevue, WA (US); Neelakantan Sundaresan, Bellevue, WA (US); Alexey Svyatkovskiy, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 566 days.

(21) Appl. No.: 16/897,802

(22) Filed: Jun. 10, 2020

(65) Prior Publication Data

US 2021/0357187 A1 Nov. 18, 2021

Related U.S. Application Data

(60) Provisional application No. 63/025,551, filed on May 15, 2020.

(51) Int. Cl.
*G06F 9/44* (2018.01)
*G06F 8/33* (2018.01)
*G06F 8/35* (2018.01)
*G06F 40/274* (2020.01)
*G06N 3/08* (2023.01)

(52) U.S. Cl.
CPC ............... *G06F 8/33* (2013.01); *G06F 8/35* (2013.01); *G06F 40/274* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 11,262,985 B2 * | 3/2022 | Luo | G06N 3/084 |
| 2019/0303109 A1 * | 10/2019 | Fu | G06F 8/33 |
| 2019/0317743 A1 * | 10/2019 | Cremeans | G06F 8/427 |
| 2020/0097261 A1 * | 3/2020 | Smith | G06N 3/084 |
| 2020/0117446 A1 * | 4/2020 | Smith | G06F 8/36 |
| 2020/0125635 A1 * | 4/2020 | Nuolf | G06N 20/20 |

(Continued)

OTHER PUBLICATIONS

Lewis et al., BART: Denoising Sequence-to-Sequence Pre-training for Natural Language Generation, Translation, and Comprehension (Year: 2019).*

(Continued)

*Primary Examiner* — Insun Kang

(57) ABSTRACT

A code completion tool uses a neural transformer model with attention to generate candidate sequences to complete a method body of a method signature. The neural transformer model is trained with source code programs and natural language text. The neural transformer model learns the meaning of a method name, its corresponding method parameters and types from a large corpus of unsupervised dataset of source code methods and a supervised dataset of tasks including source code constructs in combination with natural language docstrings to infer a candidate sequence of subtokens that represent a method body for a particular method signature.

20 Claims, 14 Drawing Sheets

(56) References Cited

U.S. PATENT DOCUMENTS

| | | | |
|---|---|---|---|
| 2020/0175316 A1* | 6/2020 | Fu | G06N 20/00 |
| 2021/0056211 A1* | 2/2021 | Olson | G06N 20/00 |
| 2021/0342377 A1* | 11/2021 | Galle | G06N 20/10 |

OTHER PUBLICATIONS

Tao, CN-110750297-A English translation (Year: 2020).*

Alt et al., "Fine-tuning Pre-Trained Transformer Language Models to Distantly Supervised Relation Extraction" (Year: 2019).*

EP3582125, Eng text (Year: 2019).*

Svyatkovskiy et al., "IntelliCode Compose: Code Generation using Transformer," 2020 (Year: 2020).*

"International Search Report and Written Opinion Issued in PCT Application No. PCT/US21/028524", dated Sep. 2, 2021, 14 Pages.

Akoury, et al., "Syntactically Supervised Transformers for Faster Neural Machine Translation", In Journal of Computing Research Repository, Jun. 6, 2019, 13 Pages.

Allard, Maxime, "What is a Transformer?", Retrieved from https://medium.com/inside-machine-learning/what-is-a-transformer-d07dd1fbec04, Jan. 4, 2019, 12 Pages.

Cho, et al., "Describing Multimedia Content using Attention-based Encoder-Decoder Networks", In Journal of Computing Research Repository, Jul. 4, 2015, 12 Pages.

Clark, et al., "More Efficient NLP Model Pre-training with ELECTRA", Retrieved from: https://ai.googleblog.com/2020/03/more-efficient-nlp-model-pre-training.html, Mar. 10, 2020, 5 Pages.

Devlin, et al., "BERT: Pre-training of Deep Bidirectional Transformers for Language Understanding", In Repository of arXiv:1810.04805v2, May 24, 2019, 16 Pages.

Lewis, et al., "BART: Denoising Sequence-to-Sequence Pre-training for Natural Language Generation, Translation, and Comprehension", In Journal of Computing Research Repository, Oct. 29, 2019, 10 Pages.

Raganato, et al., "An Analysis of Encoder Representations in Transformer-Based Machine Translation", In Proceedings of the EMNLP Workshop BlackboxNLP: Analyzing and Interpreting Neural Networks for NLP, Nov. 1, 2018, pp. 287-297.

Sukhbaatar, et al., "Adaptive Attention Span in Transformers", In Proceedings of the 57th Annual Meeting of the Association for Computational Linguistics, Jul. 28, 2019, pp. 331-335.

Vincent, et al., "Extracting and Composing Robust Features with Denoising Autoencoders", In Proceedings of the 25th International Conference on Machine Learning, Jun. 5, 2008, pp. 1096-1103.

Mukherjee, et al., "Searching a Database of Source Codes Using Contextualized Code Search", In Repository of arXiv:2001.03277v1, Jan. 10, 2020, 15 Pages.

"Invitation To Pay Additional Fees issued in PCT Application No. PCT/US21/028524", Mailed Date: Jul. 12, 2021, 9 Pages.

OTT, et al., "fairseq: A fast, Extensible Toolkit for Sequence Modeling", In Proceedings of the Conference of the North American Chapter of the Association for Computational Linguistics: Human Language Technologies, Jun. 2, 2019, 6 Pages.

Raffel, et al., "Exploring The Limits of Transfer Learning with A Unified Text-To-Text Transformer", In Journal of Computing Research Repository, Oct. 23, 2019, 52 Pages.

Vaswani, et al., "Attention Is All You Need", In Journal of Computing Research Repository, Jun. 2017, pp. 1-15.

Wang, et al., "Neural Machine Translation with Byte-level Subwords", In Journal of Computing Research Repository, Sep. 2019, 7 Pages.

* cited by examiner

NEURAL METHOD COMPLETION BASED ON NATURAL LANGUAGE AND SOURCE CODE

CROSS-REFERENCE TO RELATED APPLICATIONS

The present application claims the benefit of the earlier filed provisional application having Ser. No. 63/025,551 filed on May 15, 2020.

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that aids the developer in editing code by automatically presenting a list of possible candidates based on one or more characters (e.g., letters, symbols, etc.) that a developer has typed into a source code editor. A popup menu may appear with several suggested code elements that the developer may utilize. This assistance is beneficial since it speeds up the development time and reduces common errors, such as typos.

However, the automatic code completion feature may be problematic when the code completion system does not recognize an out-of-vocabulary code element, requires a lot of memory, takes too long to generate a list of candidates, and/or generates a list of candidates that are not relevant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code completion system predicts a method body to complete a method signature using a neural transformer model with attention. The neural transformer model predicts the programming language instructions that implement a method based on a given method signature or on a given combination of a method signature and natural language text describing the method. The neural transformer model predicts the entire method body including local variables. The neural transformer is also capable of correctly using language keywords and delimiters and predicts data types associated with the method.

The neural transformer model is trained through multimodal learning which integrates source code and natural language text. The neural transformer model is pre-trained on a large corpus of unsupervised source code methods from various programming languages in order to learn the structure of a method signature and a method body and the relationships between them. The neural transformer model is then fine-tuned on various translation tasks using combinations of the features which include a method signature, method body and natural language text describing the method (i.e., method docstring) in order to learn to translate an input sequence to an output sequence. In this manner, the neural transformer model is able to capture the intent of a method and the meaning of method names, method arguments, and the associated data types from both the source code and natural language text.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a code completion system that automatically generates a method body to complete a method signature. The code completion system is based on a sequence-to-sequence neural transformer model with attention. Method body completion is the task of predicting the contents of a method body in the context contained by a method signature, which is a structured label, and optionally, a natural language description of the inputs and outputs of the method (i.e., document string).

Code completion is a tool that attempts to predict the next string of characters that a developer (e.g., user, end-user, programmer, etc.) may type into a source code development tool, such as a source code editor. Source code may consist of various elements (e.g., keywords, delimiters, variables, methods, constants, operators, etc.) that are combined in a particular order in accordance with the grammar of the underlying programming language to form an expression that is used in a program statement. A method signature contains a method name and optionally a parameter list. The method body contains the source code programming language statements that implement the method. A document string is a string associated with the method which is a natural language statement expressing the intent of the method, and sometimes a description of the input, outputs, or idiosyncratic behavior contained therein.

Figure 1A:
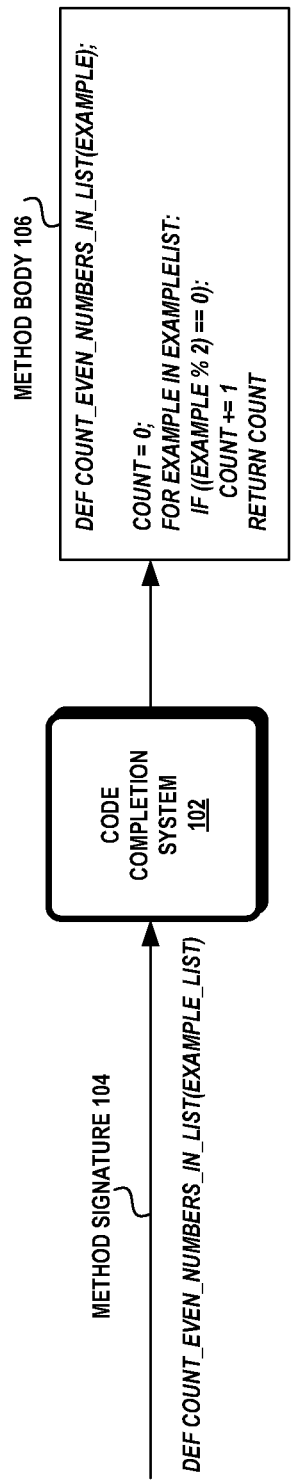
FIG. 1A illustrates an exemplary code completion system that predicts a method body to complete a method declaration given a method signature and FIG. 1B illustrates an exemplary code completion system that predicts a method body to complete a method declaration given a method signature and associated document string.

The code completion system suggests to a software developer a method body given a method signature as input and optionally a natural language statement describing the method. For example, as shown in FIG. 1A, a developer may be writing a declaration for a method signature, in the Python programming language, such as DEF COUNT_EVEN_NUMBERS_IN_LIST(EXAMPLE_LIST) 104. The code completion system 102 predicts a corresponding method body 106 based on the method signature 104. The method body 106 is provided as a recommendation to complete a method declaration as the developer is typing in a software development tool. The method body 106 contains source code instructions in the same programming language that implements the method of the method signature 104.

Figure 1B:
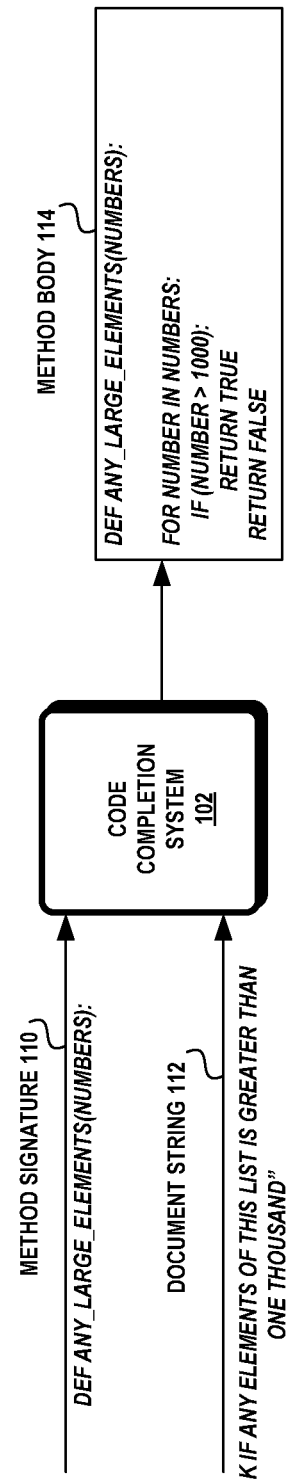

In another aspect, as shown in FIG. 1B, the code completion system 102 may detect that a developer typed a method declaration, DEF ANY_LARGE_ELEMENTS(NUMBERS) 110, and a natural language text or document string 112 that describes the method signature, such as CHECK IF ANY ELEMENTS OF THIS LIST IS GREATER THAN ONE THOUSAND. The code completion system 102 takes both the method signature 110 and the document string 112 and outputs a predicted method body 114

The code completion system 102 is based on a neural transformer model with attention trained on multiple modalities, such as source code and natural language text (e.g., documentation in source code). The neural transformer model handles dependencies between its input and output with attention and without using recurrent neural networks (RNN) (e.g., long short-term memory (LSTM) network) and convolutional neural networks (CNN). Attention is a mechanism that identifies which parts of an input sequence are relevant to each symbol in the output sequence and allows the neural transformer to access the entire input sequence all at once.

The neural transformer model is pre-trained on a large unsupervised training dataset of source code using a span masking objective, wherein the neural transformer model learns the relationships between different source code elements by predicting the original spans of source code that were masked. The pre-trained neural transformer model is then fine-tuned on several translation tasks using different features of a supervised training dataset. The fine-tuning allows the neural transformer model to adapt the correlations across the different modalities to address a particular translation task.

Attention now turns to a description of the architecture of the neural transformer model.

Neural Transformer Model Architecture

Figure 2:
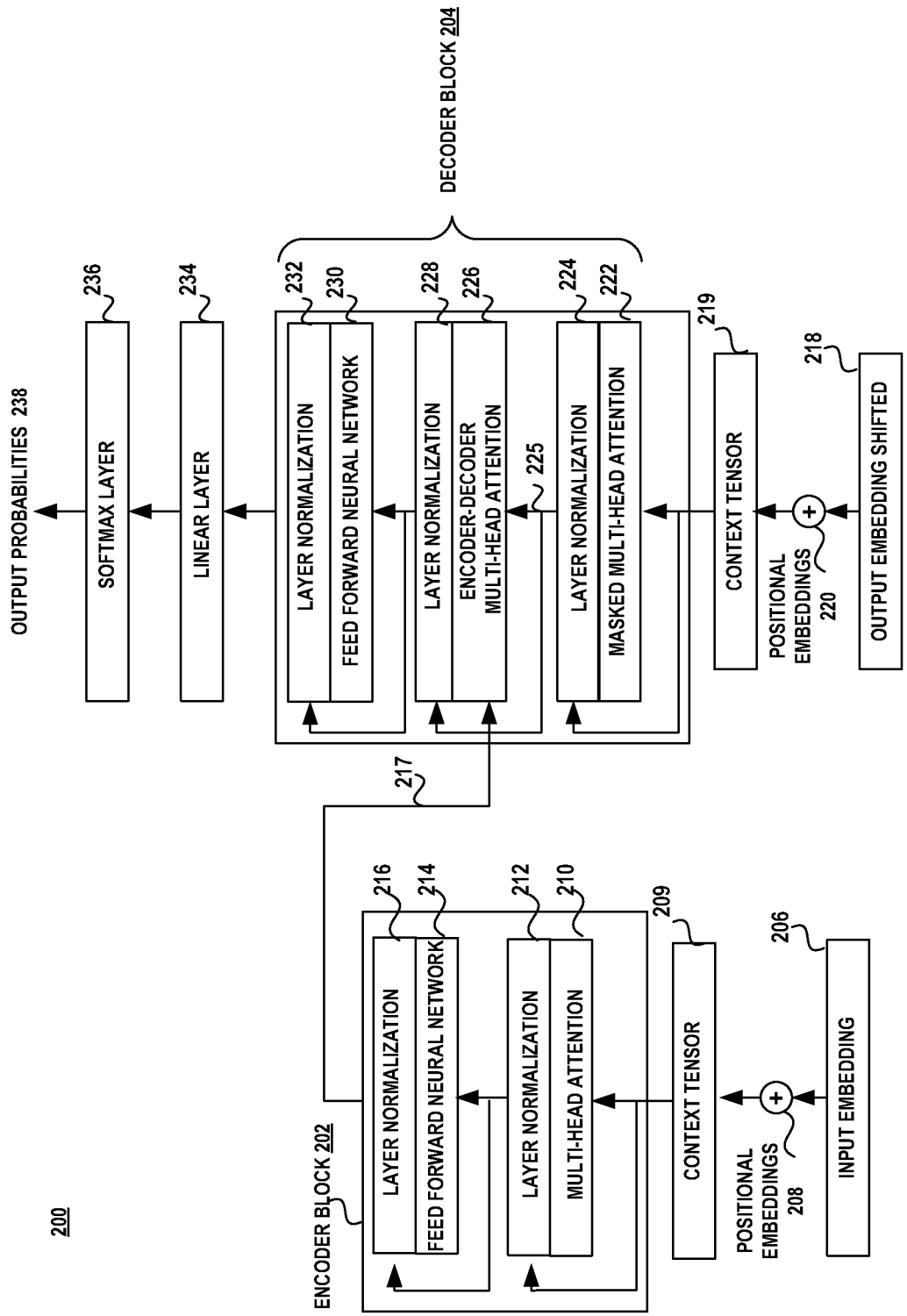
FIG. 2 is a schematic diagram illustrating an exemplary architecture of a neural transformer model based on encoder and decoder blocks with attention.

FIG. 2 shows an exemplary structure of the neural transformer model in an encoder-decoder configuration. The neural transformer model 200 contains one or more encoder blocks 202 and one or more decoder blocks 204. The initial inputs to an encoder block 202 are the input embeddings 206 of an input sequence of the training dataset. In order to retain the order of the tokens in the input sequence, positional embeddings 208 are added to the input embedding 206 forming a context tensor 209. The initial inputs to the decoder block 204 are a shifted sequence of the output embeddings 218 to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

MultiHead($Q,K,V$)=Concat(head$_1$, . . . ,head$_h$)$W^o$, where head$_i$=Attention(QW$_i^Q$, Kw$_i^K$, VW$_i^V$),
with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately 213. The output of the top encoder block is a set of attention vectors K and V 217 which is used by the encoder-decoder multi-head attention layer 226 of the decoder block 204.

The decoder block 204 predicts each subtoken $t_i$ in the target language one-by-one at each time step conditioned on all previously-generated target subtokens $t_1, \ldots, t_{i-1}$. The decoder block 204 consists of three layers. The first layer includes a masked multi-head attention component 222 followed by a layer normalization component 224. The output of the layer normalization component 224 is input into the encoder-decoder multi-head attention component 226 with a residual connection to layer normalization component 228. The second layer includes an encoder-decoder multi-head attention component 226 followed by a layer normalization component 228. The output of layer normalization component 228 is input into the feed forward neural network 230 with a residual connection to layer normalization component 232. The third layer includes a feed forward neural network 230 followed by a layer normalization component 232.

The masked multi-head attention component 222 receives the output embeddings of the previous timestep. The masked multi-head attention component 222 masks the output embeddings from future time steps. The encoder-decoder multi-head attention layer 226 receives queries from the previous decoder layer 225 and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

The linear layer 234 projects the vector produced by the stack of decoders into a logits vector. The softmax layer 236 then turns the scores of the logits vector into probabilities for each subtoken in the vocabulary which are positive and normalized.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Neural Transformer-Based Code Completion

Figure 3:
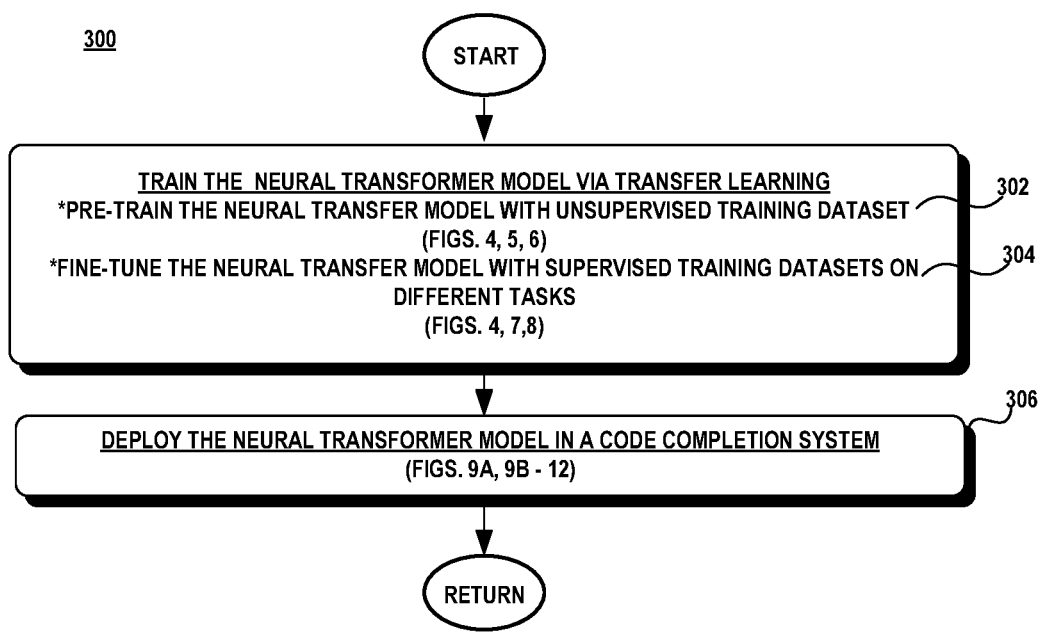
FIG. 3 is a flow diagram illustrating an exemplary method for training the neural transformer model and deploying the neural transformer model in a code completion system.

FIG. 3 is a flow diagram illustrating an exemplary process of a neural transformer model-based code completion system 300. Initially, the neural transformer is trained through a transfer learning process that includes pre-training the neural transformer model with an unsupervised training dataset (block 302) and fine-tuning the neural transformer model with a supervised training dataset (block 304). The unsupervised training dataset includes source code and the supervised training data includes both source code and natural language text. When the model has been trained and verified successfully, the model is deployed into a code completion system (block 306).

Transfer Learning

The neural transformer model is trained through transfer learning. Transfer learning is a methodology of training models by pre-training the model using unsupervised learning on unlabeled data to learn generalized knowledge and then fine-tuning the model for sequence-to-sequence translation tasks via supervised learning on labeled data. The neural transformer model is pre-trained on a large unsupervised training dataset of unlabeled source code that contains the method name, method parameters, and method body using a denoising objective and then separately fine-tuned on source code and natural language docstrings on multiple translation tasks.

Figure 4:
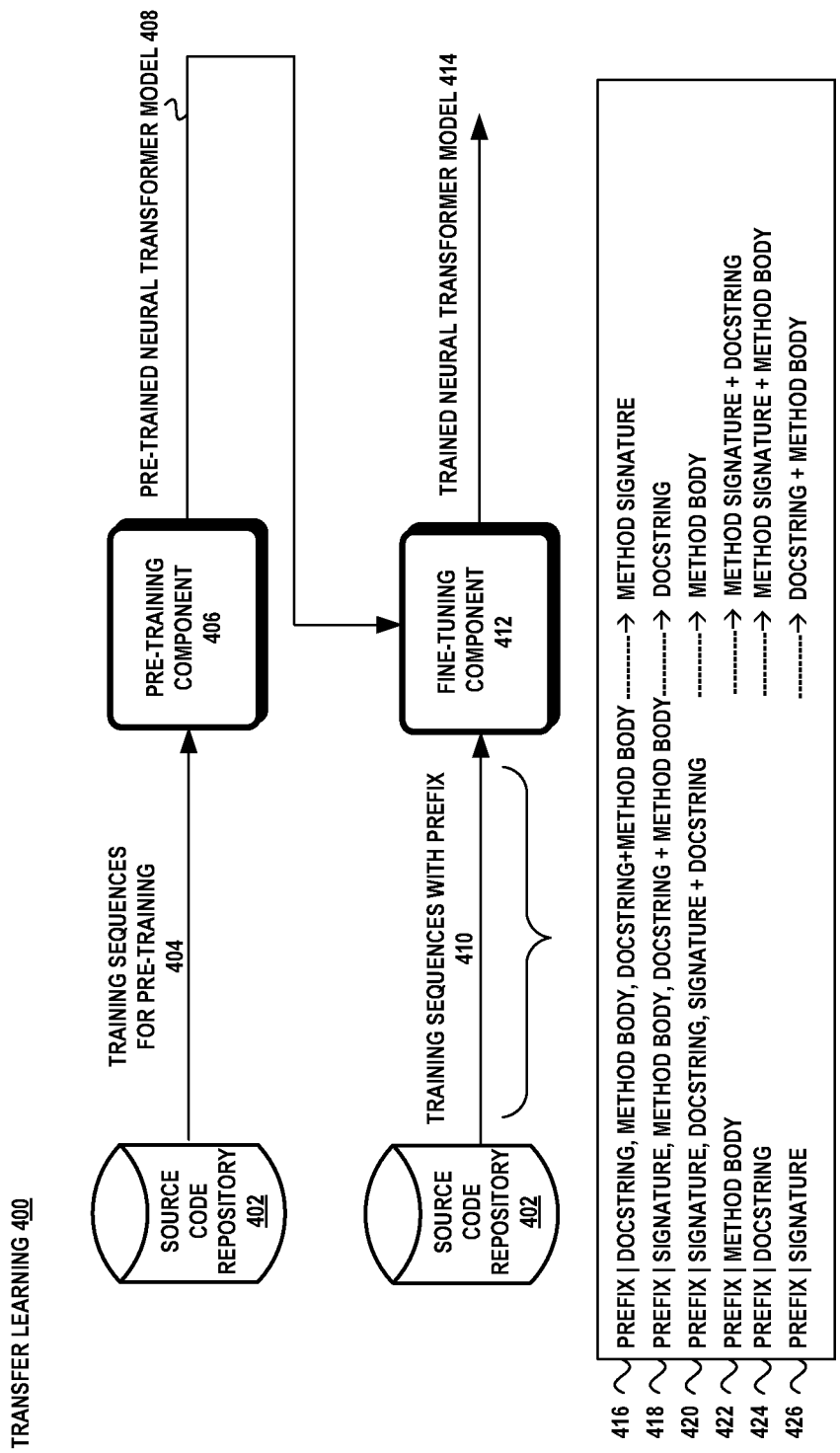
FIG. 4 is a schematic diagram illustrating an exemplary transfer learning system for training the neural transformer model.

FIG. 4 illustrates the transfer learning system 400. Turning to FIG. 4, a pre-training component 406 generates an unsupervised training dataset 404 from source code files from various source code repositories 402. The pre-training component 406 trains the pre-trained neural transformer model 408 which is then fined tuned by the fine-tuning component 412.

The fine-tuning component 412 model is then trained with a large supervised training dataset of labeled source code and natural language text obtained from various source code files of a source code repository 402. The natural language text includes text strings of descriptions of methods found in the source code referred to herein as document strings (i.e., docstring). The fine-tuning component 412 generates a supervised training dataset 410 to train the pre-trained neural transformer model 408 for specific translation tasks. The supervised training dataset 410 consists of a prefix that identifies the translation task that the model is to learn. There are various translation tasks, such as method signature, document string, method body, method signature and document string, method signature and method body, and document string and method body. The prefix indicates a sequence-to-sequence translation task the model is to associate the input sequence with. For example, a prefix may include "#target method body" which indicates that model is to correlate the input features to a method body. Similarly, the prefix "#target method signature and method body" indicates that the model is to correlate the input features to a method signature and a method body.

The training sequence 410 consists of combinations of a method signature, method body and document string which are tailored to generate a particular output. The combination of a document string, method body, and document string with a method body are used to train a method signature 416. The combination of a signature, method body, and document string with a method body are used to train a document string 418. The combination of a signature, document string, and method signature with a document string are used to train a method body 420. A method body is used to train the combination of a method signature and a method body 422. A document string is used to train the combination of a method signature and method body 424. A method signature is used to train the combination of a document string and a method body 426.

Figure 5:
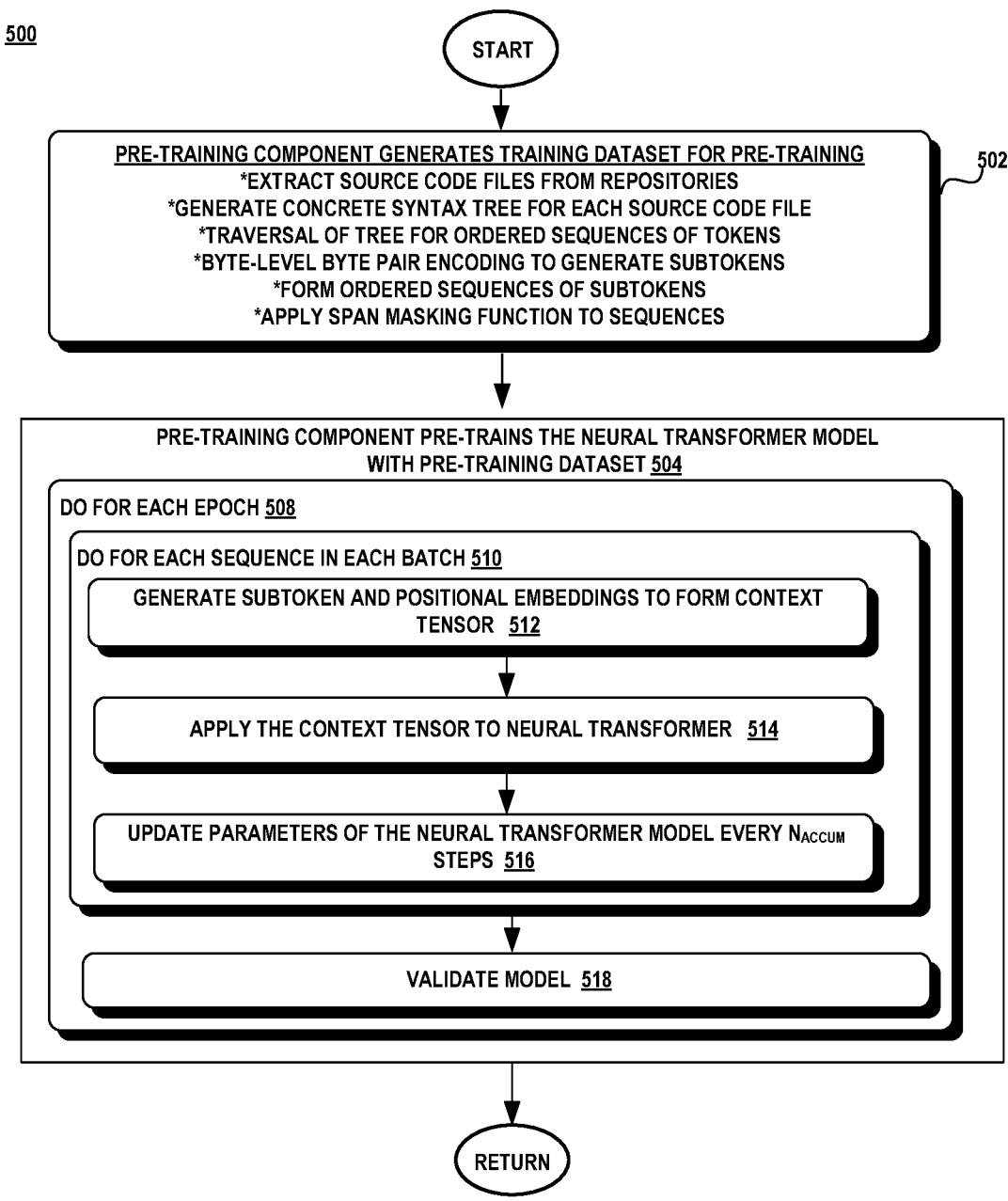
FIG. 5 is flow diagram illustrating an exemplary method for pre-training the neural transformer model.
Figure 6:
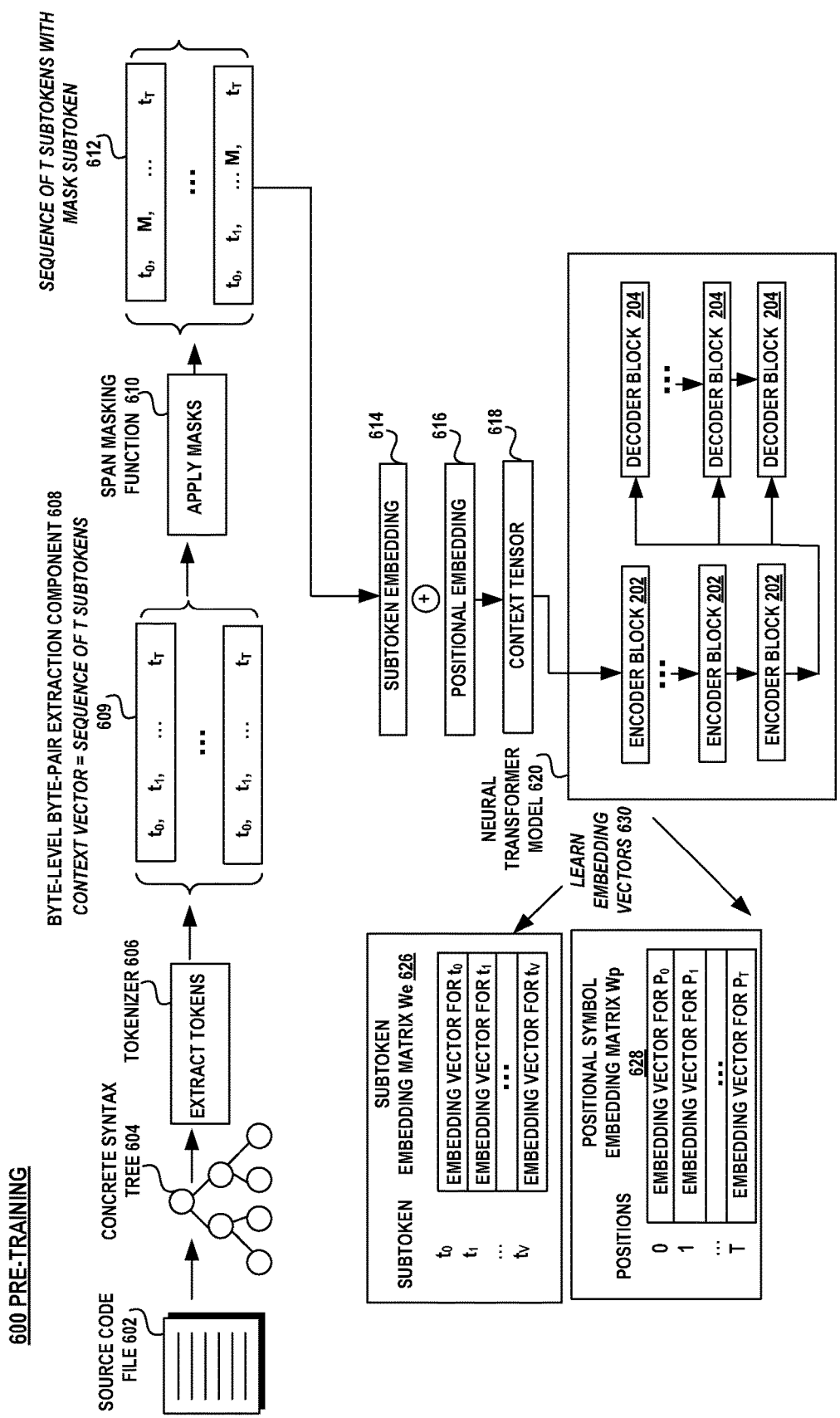
FIG. 6 is a schematic diagram illustrating an exemplary process for pre-training the neural transformer model and the components used therein.

FIGS. 5 and 6 illustrate an exemplary method for pre-training the neural transformer model. Turning to FIGS. 4, 5 and 6, the pre-training training component 406 generates a training dataset to pre-train the neural transformer model 408 (block 502). The pre-training component 406 generates a pre-training dataset from a diverse corpus of unlabeled source code programs or files 602. This is referred to as unsupervised learning since the model draws inferences from the input data without labeled responses. The pre-training component 406 extracts selected source code files 602 from various source code repositories 402. The source code files 602 contain context beyond method bodies, method signatures, and docstrings, such as imports, globals, comments, and scripts.

A source code repository 402 may be a file archive and web hosting facility that stores large amounts of source code either privately or publicly. A source code repository 402 can be structured as a version control system, such as GIT, Mercurial, etc. The source code files residing in the source code repository 402 vary and may be written in different programming languages. The selected source code files 602 can come from different domains, such as without limitation, scientific computing, web development, dataflow programming, machine learning, and the like.

The pre-training component 406 transforms each of the selected source code files 602 into a concrete syntax tree 604. The concrete syntax tree 604 represents the source code text in the parsed form. The concrete syntax tree 604 may also be a parse tree. A concrete syntax tree 604 represents the syntactic structure of a program in a hierarchical or tree structure. The concrete syntax tree 604 is an n-ary tree data structure that includes nodes that represent a construct in the grammar of the programming language of a program. The concrete syntax tree 604 includes one root node, multiple internal nodes, and multiple terminal nodes. The terminal nodes represent the tokens. A token is a symbol that represents an operand or an operator. The concrete syntax tree 604 differs from an abstract syntax tree where the terminal nodes represent operands. (Collectively, block 502).

The pre-training component 406 uses a tokenizer 606 to extract tokens from the concrete syntax tree 604. The frequently-used elements in a programming language are encoded into tokens and the less frequently-occurring elements are encoded into combinations of characters referred to as subtokens. For simplicity, the term subtoken shall include tokens and subtokens.

The pre-training component 406 uses a byte-level byte-pair extraction algorithm 608 to generate T-ordered sequences of subtokens 609, where T is the maximum context length. Byte-level byte-pair encoding (BBPE) is used to generate the vocabulary used by the neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 502).

The byte-level subwords are generated using the Byte Pair Encoding (BPE) algorithm, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a source code fragment or natural language text. The T-ordered sequence of subtokens are represented in a context vector 610. (Collectively, block 502).

A denoising function, such as a span masking function 610, is then applied to each sequence 612 that randomly masks out a subset of subtokens and the masked span of subtokens is replaced with a mask subtoken, M. The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 502).

The pre-training component 406 then pre-trains the neural transformer model with the pre-training dataset. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 504).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 504).

In one aspect, the hyperparameters may include the following: (1) subtoken and position embedding layers of dimensions: 30000×768, and 1024×768 respectively; (2) the configuration of the neural transformer model with six encoder blocks and six decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; (4) the data normalization procedure: normalize all string and numerical literals, keeping the ten most frequent; and (5) the vocabulary encoding procedure: byte-level byte-pair encoding, preserve the ten most frequent string and numerical literals encoding them as a single token during byte-level byte-pair encoding procedure; and introduce special control flow tokens to denote end-of-line, end-of-file, end-of-method, dedent, and indent symbols. (Collectively, block 504).

For each sequence of each batch in each epoch (blocks 508, 510), the T-ordered sequences of subtokens are then mapped into numeric vectors and then into respective subtoken embeddings 614 and positional embeddings 616 (block 512). An embedding is a learned representation for the text-based subtokens where subtokens that have a common meaning have a common representation. An embedding is a mapping of discrete categorical variables to a vector of continuous numbers. There is an embedding for each subtoken in the vocabulary 614 and a corresponding positional embedding 616. The subtoken embedding 614 represents the learned representation for the subtoken. The neural transformer model does not read each subtoken sequentially and as such, has no knowledge of the subtoken's position in a sequence without additional position information. The positional embedding 616 is used to embed position information about a subtoken's position in a sequence into the neural transformer model 620.

Initial values are generated for the subtoken embedding and positional embeddings of each sequence which are then used to form a context tensor 618. Thereafter, the neural transformer model 620 learns the values for each embedding. Upon the completion of the training phase, the embeddings for each subtoken and the positional embeddings are saved into respective matrices for later use. There is a subtoken embedding matrix, We, 626 that contains an embedding vector for each subtoken $t_i$, i=0 . . . V, and a positional embedding matrix, Wp, 628 that contains an embedding vector $P_j$, j=0 . . . T, for each position, where V is the size of the vocabulary and T is the length of the subtoken sequence. (Collectively, block 512).

The first encoder block 622 of the neural transformer model 620 takes the context tensor 618 as input and passes it through the multiple layers of multi-head attention, layer normalization and feed-forward neural network to finally produce a set of hidden representations. If there are additional encoder blocks, the output of each encoder block is passed onto the next encoder block with the output of the last encoder block producing the set of hidden representations. The set of hidden representations is passed onto each decoder block. (Collectively, block 514).

The decoder blocks 624 of the neural transformer model 620 takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 514).

The feed forward neural networks in the encoder blocks 622 and the decoder blocks 624 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 514).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 516).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 518).

Fine-Tuning Training

After the pre-training is performed, the neural transformer model is fine-tuned on individual supervised tasks. The fine-tuning ensures that the neural transformer model understands the relationship between a method signature, a method body, and a document string that corresponds to the method by training the model with different combinations of these features. The repetition of the features in different combinations improves the model's ability to learn the relationships between the different features. A prefix is prepended to the context vector to instruct the neural transformer model which task it is to target.

The pre-trained model is fine-tuned on the translation tasks. Specifically, the optimization objective during fine tuning includes method body prediction given the method signature, or the method signature and the natural language text as an input. The weights of the pre-trained model are transferred and joined to optimize all of the trainable parameters—including both the transformer layers and the task-specific head of the model.

Figure 7:
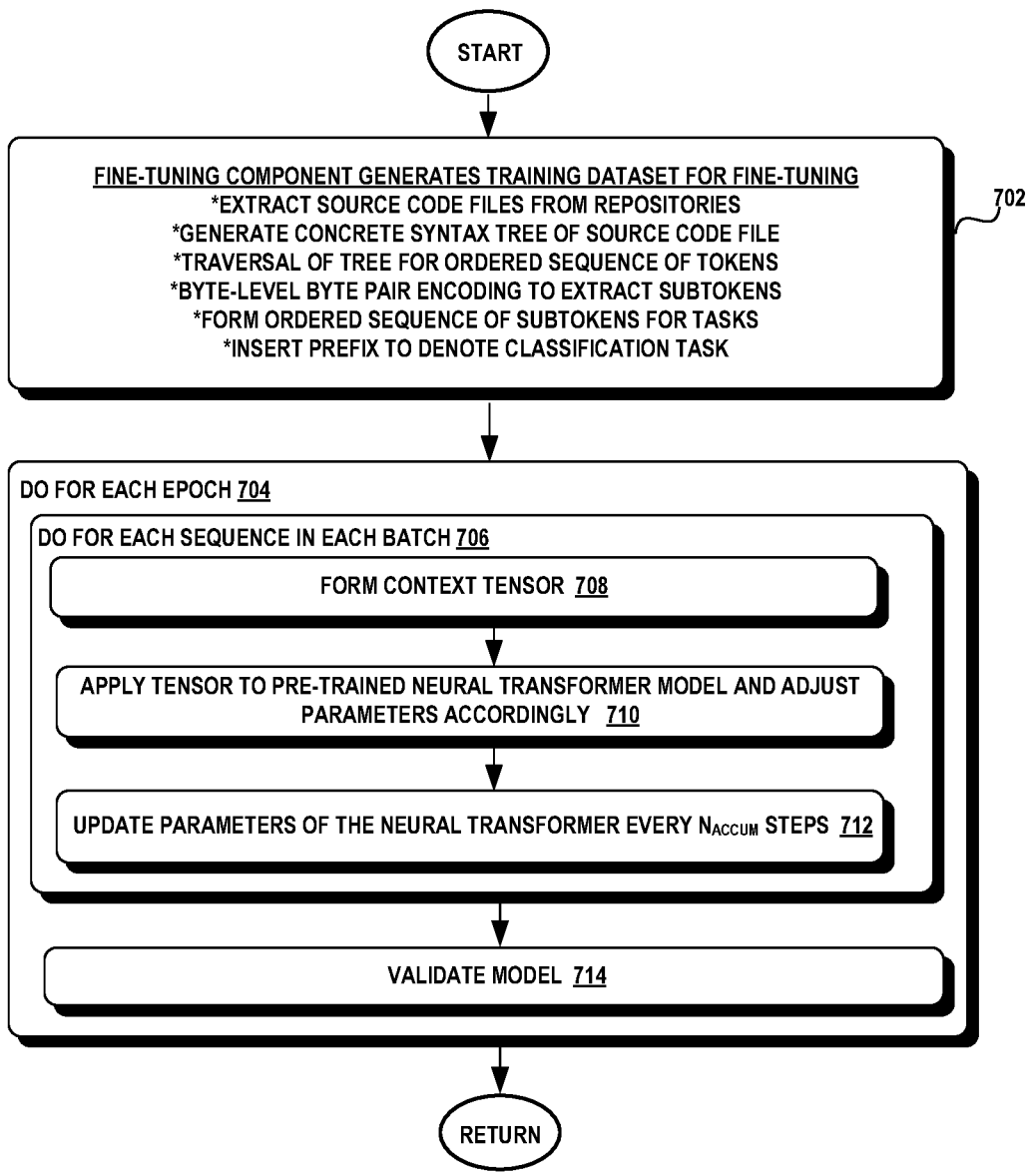
FIG. 7 is a flow diagram illustrating an exemplary method for fine-tuning the neural transformer model.
Figure 8:
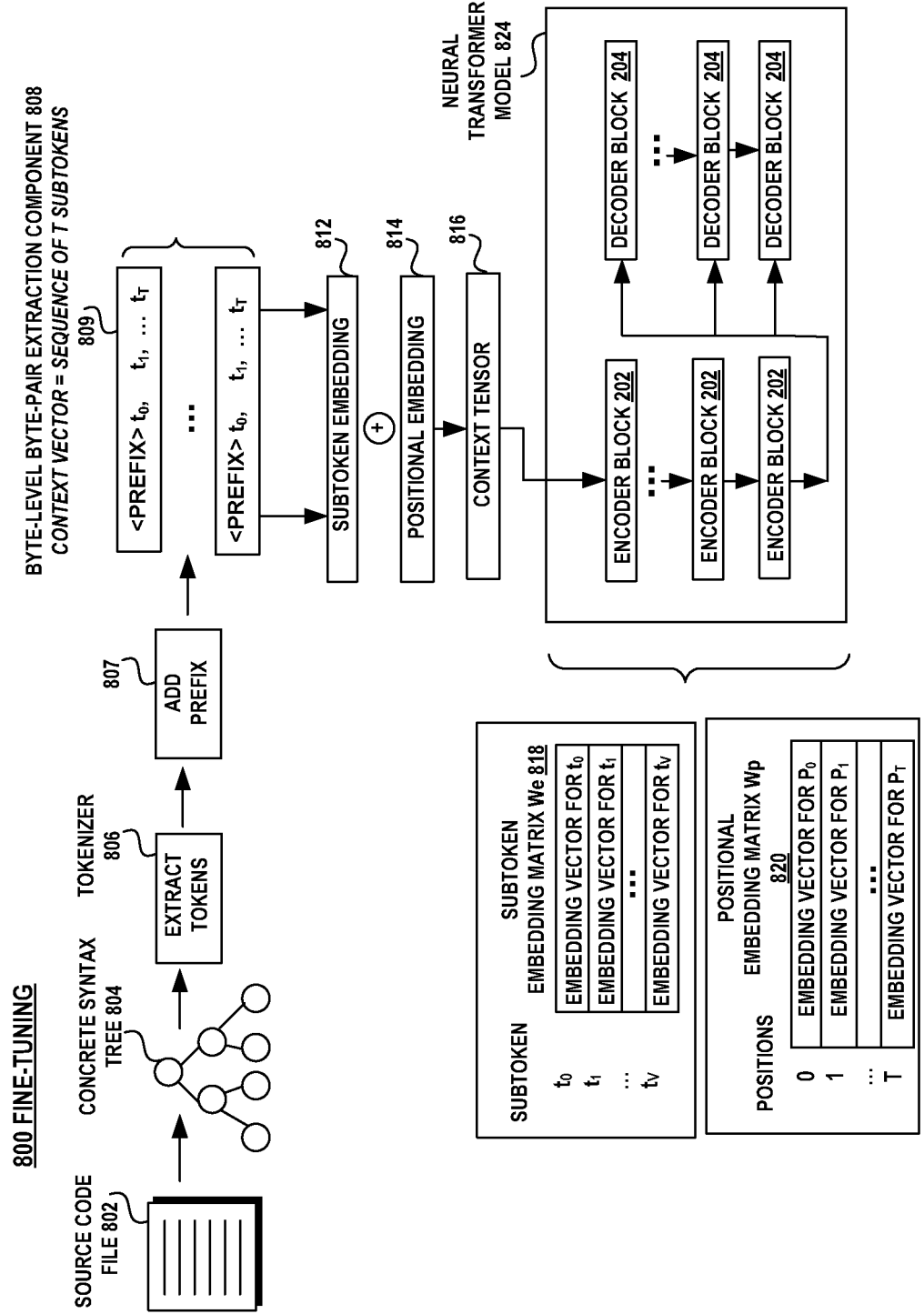
FIG. 8 is a schematic diagram illustrating an exemplary process for fine-tuning the neural transformer model and the components used therein.

Turning to FIGS. 4, 7, and 8, the fine-tuning component 412 generates training datasets from a source code repository containing various combinations of method signatures, method bodies and corresponding document strings. In particular as shown in FIG. 4, the training sequences 416-426 contain various combinations of features that are used in the training dataset with a prefix prepended to the sequence indicating the target task. For example, the combination of a docstring, method body, and docstring and method body have a prefix indicating a method signature 416. The prefix acts as an imperative which the model learns to interpret since the model is always shown the prefix informing the model about the target translation task. Therefore, the neural transformer model learns to associate the prefix with the type of intended translation target.

The fine-tuning training 800 follows a similar method noted above with respect to the pre-training. Initially, the fine-tuning component 412 generates a fine-tuning dataset from source code files 802 obtained from a source code repository 402. A concrete syntax tree 804 is generated for each method in the file from which the fine-tuning component 412 uses a tokenizer 806 to extract an ordered sequence of tokens. The tokens are then converted into a byte-level byte pair encoded representation using a byte-level byte-pair extraction component 808 and then into an ordered sequence of subtokens 809. The sequence 809 is prepended with a prefix 807 indicating the target representation. (Collectively, block 702).

A subtoken embedding 812 and positional embedding 814 is generated for each sequence of each batch of each epoch. The subtoken embedding 812 and the positional embedding 814 are combined into a context tensor 816 (blocks 704, 706, 708). The context tensor 816 is applied to neural transformer model, as noted above, thereby updating the subtoken and positional embedding matrices 818, 820 (block 710).

The parameters are updated for every Naccum steps (block 712). The neural transformer model is then validated before deployed into a code completion system (block 714).

Attention now turns to discussion of the use of the neural transformer model in an inference system.

Inference Phase

The inference phase of the code completion system relies on a beam search to generate one or more method bodies to complete a method signature. The decoder's computation at training time can be parallelized using masked self-attention but during inference, the subtokens are generated one token at a time. The neural transformer model factorizes the probability of the target subtokens in an input sequence into a product of conditional probabilities for each subtoken using the formula: $p(t_1, \ldots t_m|s) = \Pi_{i=1}^{m} p(t_i|t_1, \ldots, t_{i-1}, s)$. During inference, the calculation of arg $max_i$ p(t|s) is complex and extremely time consuming making the model useless for real-time applications. Beam search is an approximation algorithm that performs faster.

The beam search uses the probability distribution generated by the neural transformer model to identify the top k subtokens likely to be the next subtoken in a candidate sequence. The beam search expands the search by instantiating new partial sequences using each of the selected subtokens identified by the neural transformer model's probability distribution. The search continues generating new partial sequences from the top k subtokens identified by the output distributions from the neural transformer model until the search ends. The search may end when the end-of-method subtoken appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end of a method token is predicted as being the next likely subtoken candidate.

Figure 9A:
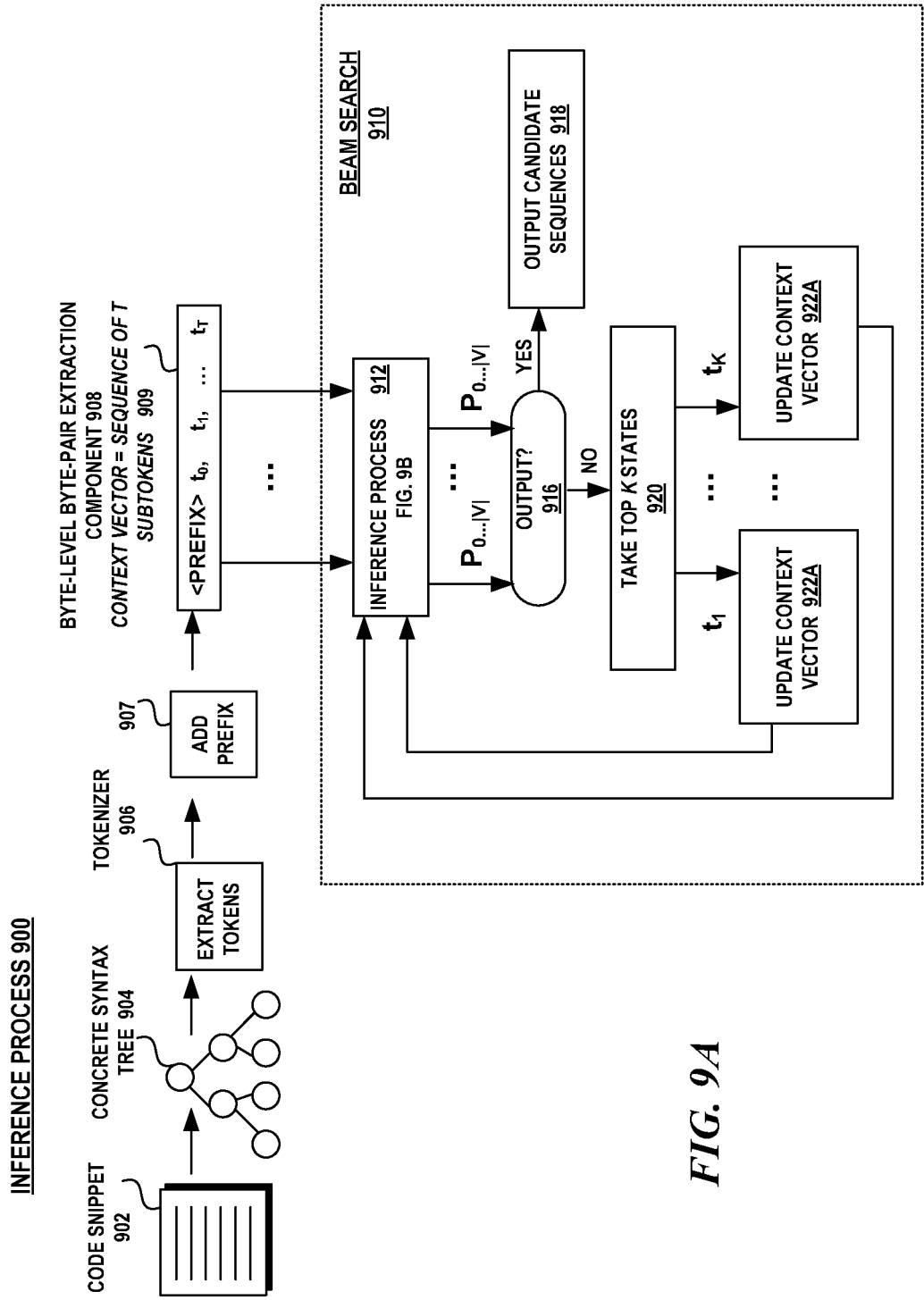
FIGS. 9A-9B are schematic diagrams illustrating the interference process that uses the neural transformer model.

Turning to FIG. 9A, there is shown components of the inference phase 900. A code snippet 902 is entered into a source code editor which is transformed into a corresponding concrete syntax tree 904. The code snippet may be a method signature or the combination of a method signature and a document string. The concrete syntax tree 404 is traversed, by a tokenizer 906, to extract tokens and/or subtokens in an ordered sequence. A prefix 907 is added to the ordered sequences at the beginning of the sequence to indicate the target of the translation. The ordered sequence of T subtokens is then vectorized into a context vector 909 using the subtoken and positional embedding matrices 926.

The beam search 910 uses the context vector 909 to initiate an inference process 912 using the probability distribution generated from the neural transformer model, $P_0 \ldots P_{|V|}$ (block 912). If the probability distribution indicates that an end-of-method token is the most likely subtoken to follow in a partial candidate sequence (block 916—yes), then the top k candidate sequences are output (block 918). Otherwise, the beam search 910 takes the top k states or subtokens identified from the probability distribution generated by the neural transformer model in the inference process (block 920). A new context vector is generated for each of the k states, $c_1, \ldots c_k$, using the new subtoken in the context vector (blocks 922A, 922B). The new context vectors are then input into the inference process (blocks 922A, 922B, 912). The beam search 910 ends when the end-of-method token is selected as the most likely candidate to complete a partial candidate sequence.

Figure 9B:
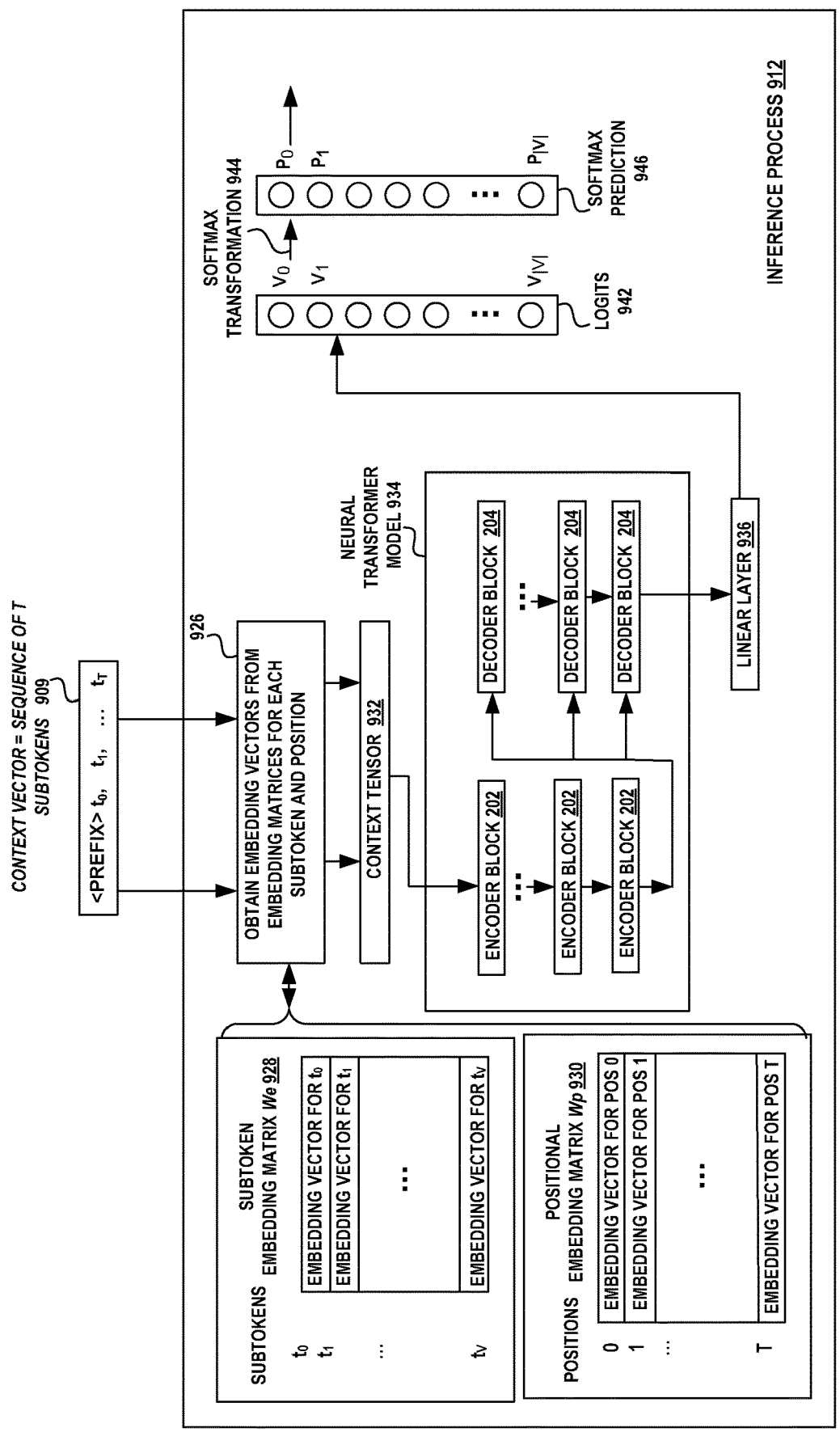

FIG. 9B illustrates an exemplary inference process 912. An embedding vector for each subtoken in a sequence 908 is obtained from the subtoken embedding matrix 928 and its corresponding positional vector from the positional embedding matrix 930. The obtained subtoken embedding vector and its corresponding positional embedding vector 926 are combined to form a context tensor 932 which is input into the neural transformer model 934. The prefix is treated as yet another tokenized feature sequence. The context tensor 932 is applied to the encoder blocks 202 and decoder blocks 204 of the neural transformer model 934.

The last decoder block outputs a vector of floating point numbers that is projected by the linear layer 936 into unnormalized predictions or logits $V_0 \ldots V_{|V|}$ 942. The logits 942 are normalized using the softmax function 944 to generate the softmax prediction 946 $P_0 \ldots P_{|V|}$.

Code Completion

Figure 10:
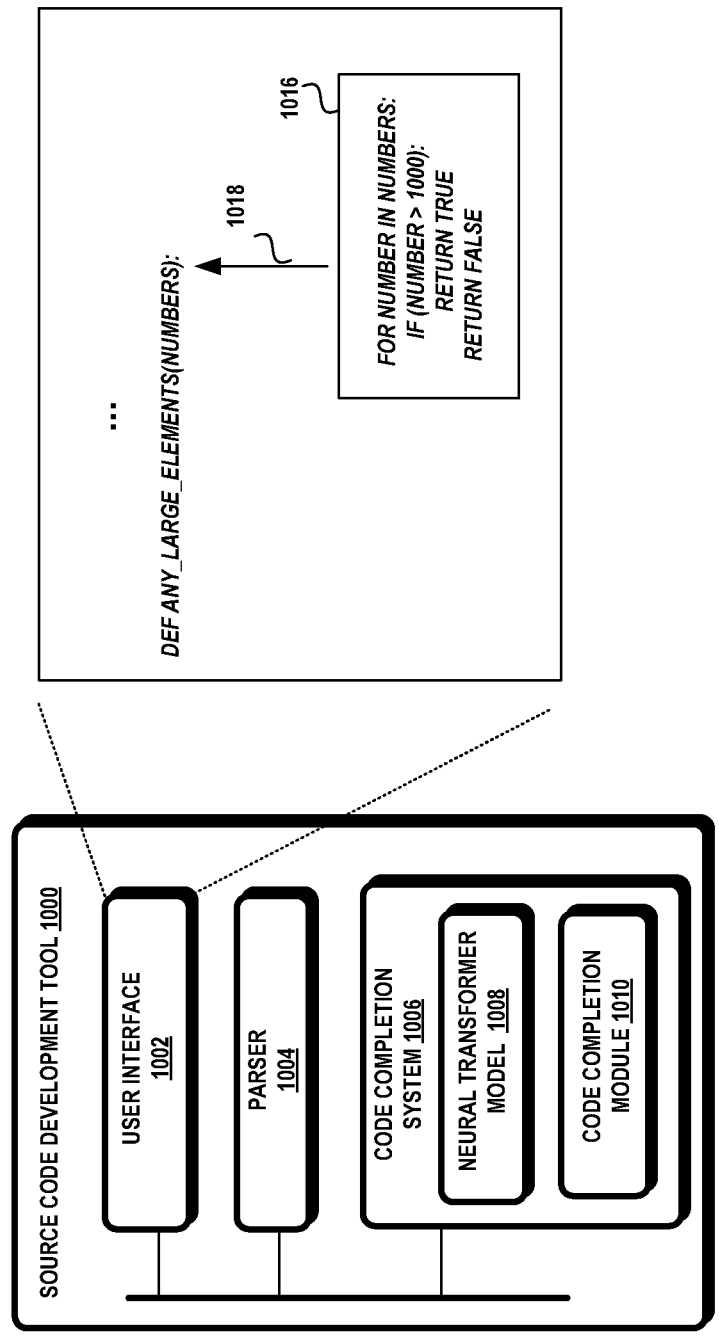
FIG. 10 illustrates an exemplary code completion system using the neural transformer model.
Figure 11:
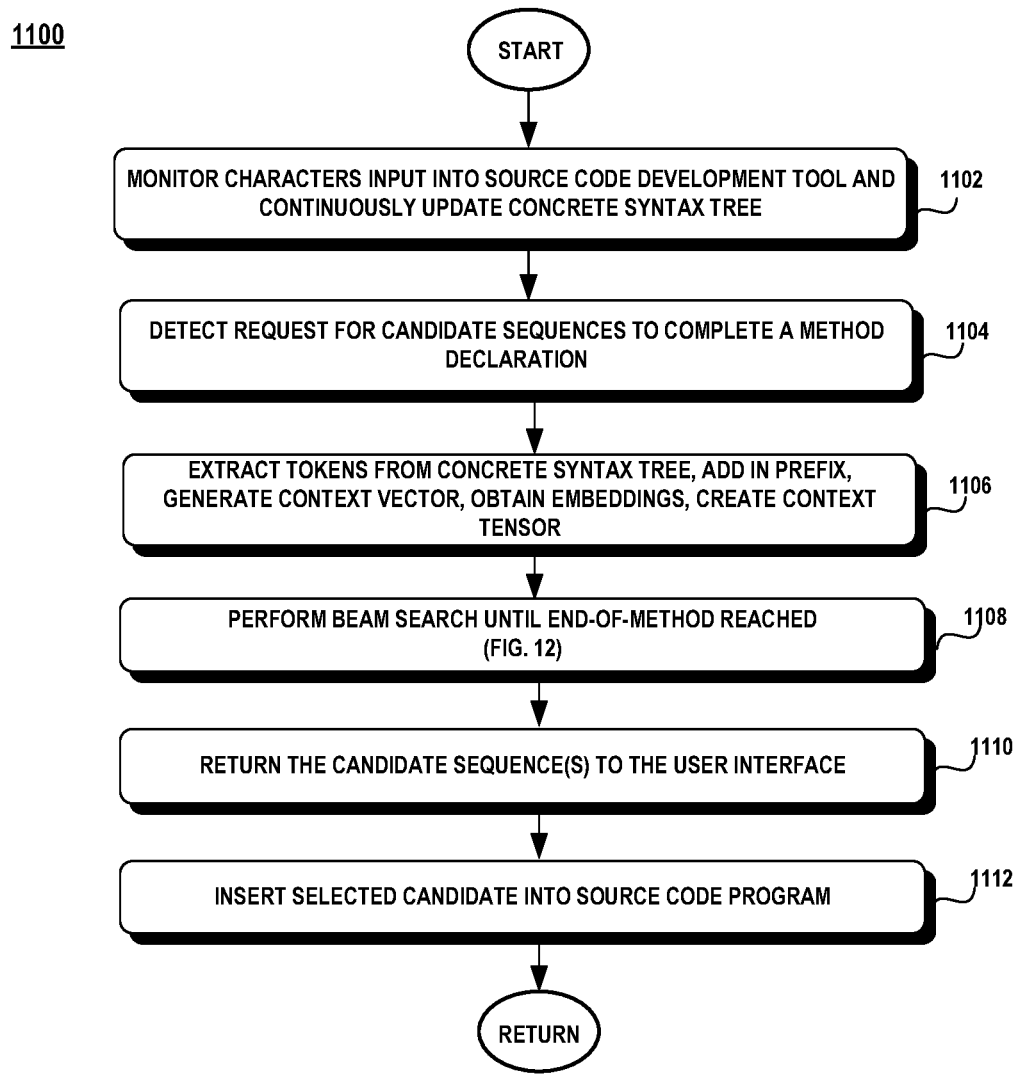
FIG. 11 is a flow diagram illustrating an exemplary method of a code completion system using the neural transformer model.

In one aspect, the neural transformer model is used in a code completion system. Referring to FIGS. 10 and 11, the inference phase of the neural transformer model may be embodied as a function or feature integrated into a source code development tool 1000, such as source code editor, integrated development environment (IDE), browser, and/or stand-alone application. Code completion may be embodied as a tool or feature that can be an add-on, plug-in, extension and/or component of a source code editor, browser, application, and/or IDE. In one aspect, a source code development tool 1000 may include a user interface 1002, a parser 1004, and a code completion system 1006. The code completion system 1006 includes the neural transformer model 1008 and a code completion module 1010.

The user interface 1002 includes a set of features or functions for developing (e.g., writing, editing, testing) a source code program. The user interface 1002 may include a window 1014 that displays the source code currently in the source code development tool 1000. The user interface may utilize a pop-up window 1016 to present possible candidate method bodies for completion thereby allowing a developer to browse through the candidates and to select one from the list. Alternatively, the candidate may appear as a continuation of the current source code program.

The parser 1004 monitors characters input into the source code development tool and generates a corresponding concrete syntax tree. The parser 1004 also updates the concrete syntax tree as the developer creates and edits the source code in the source code development tool. (Collectively, block 1102).

At certain points in the editing process, the user interface 1002 will request candidates from the code completion system 1006 to complete a method declaration (block 1104). The user interface 1002 may detect that the user has entered a particular character or a string of characters forming a method signature or method signature and a document string and automatically initiate a request for candidates to complete a method body. This character is referred to as a marker character. In one aspect, the marker character may be the colon ":" 1018 which in the Python programming language denotes the end of a method declaration statement.

The code completion system 1006 extracts subtokens from the concrete syntax tree, generates a context vector representing a sequence of subtokens, adds in the appropriate prefix, obtains embeddings for the subtokens and creates a context tensor as noted above (block 1106). The code completion system 1006 performs a beam search until an end-of-method subtoken is reached (block 1108). The top k candidate method bodies are returned to the user interface 1002 (block 1110).

The user interface 1002 may display the recommended method body candidates in a pop-up window 1016 in the user interface 1002 or alternatively display a single top candidate inserted into the current source code program. The code completion system 1006 builds and continuously updates a tree of candidates in the background regardless of whether the developer decides to trigger the candidate method body or not. A light bulb symbol may be automatically displayed in the user interface when the user has typed in a method signature or a method signature and a document string, and the system has valid completion suggestions. If the developer wants to accept the candidate method body, the developer may type in a particular keystroke or combination of keystrokes to accept the candidate method body which is then automatically inserted into the source code program (block 1112).

In this case, the cursor position will advance to the end of the suggested method body sequence and the suggested method body will automatically be inserted into the source code program. If the user does not want to use the candidate method body, the candidate method body disappears when the developer continues typing. In this case, the system would refine the code sequence based on the pre-fix filter of the tree of candidates based on the newly typed code.

Figure 12:
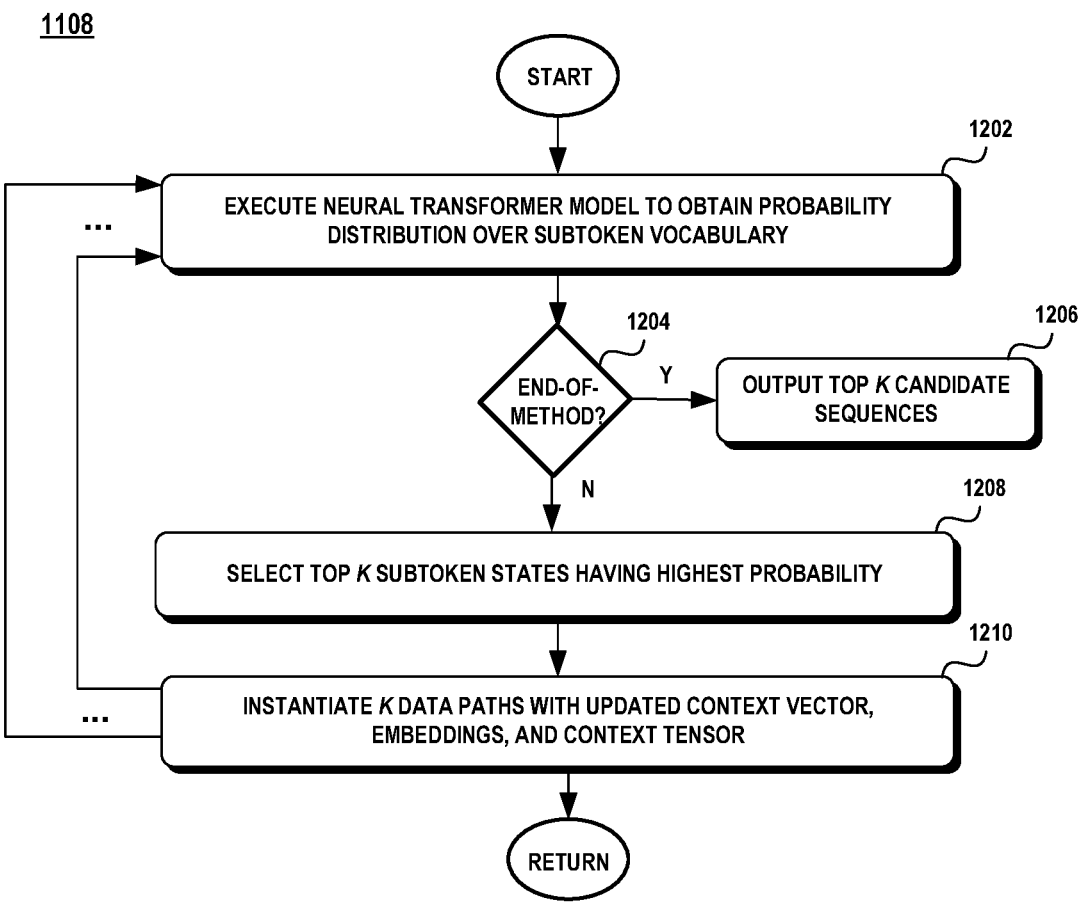
FIG. 12 is a flow diagram illustrating an exemplary method of the beam search used in the code completion system.

Turning to FIG. 12, the beam search uses the neural transformer model with the context tensor to generate a probability distribution for the subtoken vocabulary (block 1202). If the probability distribution indicates that the next likely token is the end-of-method token, then the beam search is finished (block 1204—yes) and the top k candidate sequences are returned to the user interface (block 1206). Otherwise (block 1204—no), the top k subtokens to complete a partial sequence are selected (block 1208).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 1210).

Exemplary Operating Environment

Figure 13:
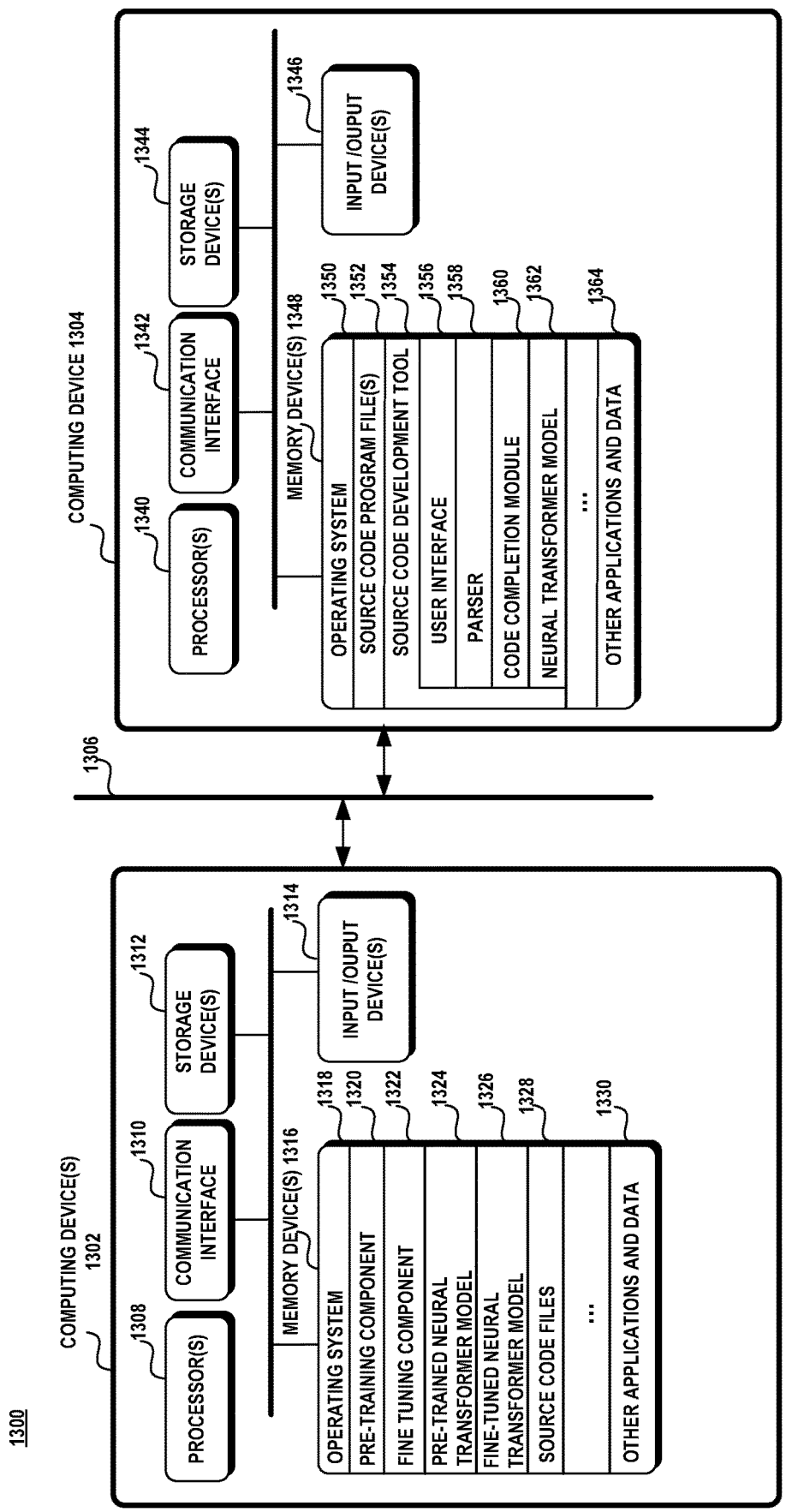
FIG. 13 is a block diagram illustrating an operating environment.

Attention now turns to a discussion of an exemplary operating environment. FIG. 13 illustrates an exemplary operating environment 1300 in which one or more computing devices 1302 are used to train the neural transformer model and a second computing device 1304 uses the neural transformer model for code completion. However, it should be noted that the aspects disclosed herein is not constrained to any particular configuration of devices. Any one of the computing devices 1302, 1304 may utilize the neural transformer model in its own code completion system and computing device 1304 may generate and test the neural transformer model as well. Computing devices 1302 may be configured as a cloud service that generates the neural transformer model as a service for other code completion systems. It should be noted that the operating environment is not limited to any particular configuration and other configurations are possible.

The computing devices 1302, 1304 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1300 may be configured in a network environment, a distributed environment, a multi-processor environment, or a stand-alone computing device having access to remote or local storage devices.

The computing devices 1302, 1304 may include one or more processors 1308, 1340, one or more communication interfaces 1310, 1342, one or more storage devices 1312, 1344, one or more input/output devices 1314, 1346, and one or more memory devices 1316, 1348. A processor 1308, 1340 may be any commercially available or customized processor and may include dual microprocessors and multi-processor architectures. A communication interface 1310, 1342 facilitates wired or wireless communications between the computing device 1302, 1304 and other devices. A storage device 1312, 1344 may be computer-readable medium that does not contain propagating signals, such as modulated data signals transmitted through a carrier wave. Examples of a storage device 1312, 1344 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1312, 1344 in the computing devices 1302, 1304. The input/output devices 1314, 1346 may include a keyboard, mouse, pen, voice input device, touch input device, display, speakers, printers, etc., and any combination thereof.

A memory device 1316, 1348 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1316, 1348 may also include one or more external storage devices or remotely located storage devices that do not pertain to propagated signals, such as modulated data signals transmitted through a carrier wave.

Computing device 1304 may utilize a source code development tool 1354 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The source code development tool

1354 may provide a native code development environment or may provide a managed code development that runs on a virtual machine or may provide a combination thereof. The source code development tool 1354 may provide a managed code development environment using the .NET framework. It should be noted that this operating embodiment is not constrained to providing the source code development services through any particular source code development tools and that other tools may be utilized instead, such as a stand-alone source code editor, IDE, browser and the like.

The memory device 1348 of computing device 1304 may contain instructions, components, and data. A component is a software program that performs a specific function and is otherwise known as a module, program, component, and/or application. The memory device 1348 may include an operating system 1350, one or more source code program files 1352, a source code development tool 1354 that may include a user interface 1356, a parser 1358, a code completion module 1360, a neural transformer model 1362 and other applications and data 1364.

The memory device 1316 of the computing devices 1302 may include an operating system 1318, a pre-training component 1320, a fine-tuning component 1322, a pre-trained neural transformer model 1324, a fine-tuned neural transformer model 1326, source code files 1328 and other applications and data 1330.

The computing devices 1302, 1304 may be communicatively coupled via a network 1306. The network 1306 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1306 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having one or more processors and a memory. The memory stores one or more programs that are configured to be executed by the one or more processors. The one or more programs include instructions that: detect a method declaration entered into a source code program in a source code development tool, the method declaration including a method signature without a method body, wherein the method declaration and the method signature are written in a programming language; generate a method body to complete the method declaration, the method body generated from a neural transformer model with attention based on the method signature; and present the method body as a candidate for code completion in the source code development tool.

In one aspect, the one or more programs include further instructions that detect a document string in the source code program, the document string written in natural language text, the document string associated with the method declaration where the neural transformer model generates the method body based on the method signature and the document string.

In an aspect, the neural transformer model is pre-trained with an unsupervised training dataset, the unsupervised training dataset including a plurality of method signature strings and a plurality of method bodies. In an aspect, random sequences of the unsupervised training dataset are sampled to replace spans of data in a sampled sequence with a mask token and the neural transformer model is pre-trained to learn to replace the mask token with original data.

In an aspect, the pre-trained neural transformer model is fine-tuned with a supervised training dataset, the supervised training dataset containing features including one or more of a method signature, a method body, and/or a document string, the supervised training dataset including translation tasks including one or more of a method signature, a method body and a document string.

In an aspect, the neural transformer model includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network.

A method is disclosed comprising: pre-training a neural transformer model with an unsupervised training dataset, the unsupervised training dataset including a plurality of sequences of source code; fine-tuning the neural transformer model with a supervised multi-modal training dataset, the supervised multi-modal training dataset based on features and a translation task, the features extracted from source code and natural language text, the translation task including a method body; and applying the neural transformer model to generate a first method body given a first method signature.

In an aspect, the method further comprises applying the neural transformer model to generate the first method body given the first method signature and a first method docstring. In an aspect, the features include a method body, a method signature, and/or method docstring. In an aspect, a sequence of source code includes a plurality of subtokens, a subtoken represented as a byte-level byte-pair encoding.

In an aspect, the method further comprises applying a span masking function to the sequence of source code to mask out a subset of subtokens, where the neural transformer model learns original subset of subtokens. In one or more aspects, the translation tasks includes a method signature, a method docstring, a method signature and a method docstring, a method signature and a method body, or a method body and a method docstring. The unsupervised multi-modal training dataset includes source code programs from multiple programming languages.

In one aspect, the neural transformer model includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network. In one aspect, the neural transformer model is deployed in a code completion system to generate a method body given a method signature.

A device is disclosed comprising at least one processor and a memory. The at least one processor is configured to: train a neural transformer model to learn to construct a method body from a plurality of unsupervised training data, the plurality of unsupervised training data including method bodies and method signatures derived from source code programs; train the neural transformer model to learn to translate from a plurality of supervised training data, the plurality of supervised training data including method bodies, method signatures, and method docstrings; and apply the neural transformer model to predict an inferred method body for a specific method signature.

In one aspect, the plurality of translation tasks include a method body, a method signature, a method docstring and combinations of a method body, method signature, or method docstring. In an aspect, the at least one processor is further configured to apply a denoising function to mask out spans of data in the unsupervised training dataset for the neural transformer model to learn original spans of data that were masked. In another aspect, the at least one processor is further configured to: apply the neural transformer model to predict an inferred method body for a specific method signature and specific method docstring.

In one or more aspects, the neural transformer model includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
a memory that stores one or more programs that are configured to be executed by the one or more processors, the one or more programs including instructions to perform actions that:
detect a method declaration entered into a source code program in a source code development tool, the method declaration including a method signature without a method body, wherein the method signature includes a method name and parameter list, wherein the method declaration and the method signature are written in a same programming language;
generate a method body to complete the method declaration, wherein the method body is generated from a neural transformer model with attention given an input sequence comprising the method signature, wherein the neural transformer model with attention includes an attention component and a neural network component, wherein the attention component relates different positions of the input sequence given to the neural transformer model with attention in terms of queries Q, keys K, and values V, wherein the attention component is outside of the neural network component, wherein the neural transformer model with attention is trained to generate a method body for a target method signature on a plurality of translation tasks to learn to generate the target method body for the target method signature, wherein each translation task uses an input sequence comprising one or more of an input docstring, an input method body, or input method signature for the neural transformer model with attention to learn to generate an associated method body, an associated method signature, an associated target docstring, or a combination of the associated method body, the associated method signature, and the associated target docstring; and
present the method body as a candidate for code completion in the source code development tool.

2. The system of claim 1, wherein the one or more programs include further instructions to perform actions that:
detect a document string in the source code program, the document string written in natural language text, the document string associated with the method declaration; and
wherein the neural transformer model with attention generates the method body based on the method signature and the document string.

3. The system of claim 1,
wherein the neural transformer model with attention is pre-trained on the an unsupervised training dataset, the unsupervised training dataset including a plurality of method signatures and a plurality of method bodies.

4. The system of claim 3, wherein the one or more programs include further instructions to perform actions that:
wherein the neural transformer model with attention is trained to generate a target method signature for a given docstring, method body, and combination of docstring and method body.

5. The system of claim 1, wherein the neural transformer model with attention is fine-tuned on a supervised training dataset, the supervised training dataset containing features including one or more of a method signature, a method body, and/or a document string, the supervised training dataset including translation tasks including one or more of a method signature, a method body and a document string.

6. The system of claim 1, wherein the neural transformer model with attention includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network.

7. A computer-implemented method, comprising:
pre-training a neural transformer model with attention with an unsupervised training dataset of source code to learn relationships between a method signature and a corresponding method body, wherein the neural transformer model with attention includes an attention component and a neural network component, wherein the attention component precedes the neural network component, wherein the attention component relates different positions of an input sequence given to the neural transformer model with attention in terms of queries Q, keys K, and values V;

fine-tuning the neural transformer model with attention with a supervised multi-modal training dataset of source code features to learn to generate a method body for a given method signature, wherein the fine-tuning performs a plurality of translation tasks, wherein each translation task uses an input sequence comprising one or more of an input docstring, an input method body, or input method signature for the neural transformer model with attention to learn to generate an associated method body, an associated method signature, an associated target docstring, or combination of the associated method body, the associated method signature, and the associated target docstring; and applying the neural transformer model with attention to generate a first method body when provided a first method signature.

8. The computer-implemented method of claim 7, wherein the plurality of translations tasks comprises a first translation task for the neural transformer model with attention to learn to generate a target docstring given a corresponding method signature, a corresponding method body and a combination of a corresponding docstring with the corresponding method body.

9. The computer-implemented method of claim 7, wherein the plurality of translations tasks comprises a second translation task for the neural transformer model with attention to learn to generate a target method body given a corresponding method signature, a corresponding docstring and a combination of the corresponding method signature with the corresponding docstring.

10. The computer-implemented method of claim 7, wherein the plurality of translations tasks comprises a third translation task for the neural transformer model with attention to learn to generate a target method signature and a corresponding docstring given a corresponding method body.

11. The computer-implemented method of claim 7, wherein the plurality of translations tasks comprises a fourth translation task for the neural transformer model with attention to learn to generate a target method signature and a corresponding method body given a corresponding docstring.

12. The computer-implemented method of claim 7, wherein the wherein the plurality of translations tasks comprises a fifth translation task for the neural transformer model with attention to learn to generate a target docstring and a corresponding method body given a corresponding method signature.

13. The computer-implemented method of claim 7, wherein the plurality of translations tasks comprises a sixth translation task for the neural transformer model with attention to learn to generate a target method signature given a corresponding docstring, a corresponding method body and a combination of the corresponding docstring and the corresponding method body.

14. The computer-implemented method of claim 7, wherein the neural transformer model with attention includes one or more encoder blocks and one or more decoder blocks, wherein an encoder block contains a multi-head attention layer and a feed-forward neural network, wherein a decoder block contains a masked multi-head attention layer, an encoder-decoder multi-head attention layer, and a feed-forward neural network.

15. The computer-implemented method of claim 7, further comprising:

deploying the neural transformer model with attention in a code completion system to generate a method body given a method signature.

16. A device, comprising:

at least one processor and a memory; wherein the at least one processor is configured to perform actions to:

train a neural transformer model with attention to learn to construct a method body from a plurality of unsupervised training data, the plurality of unsupervised training data including method bodies and method signatures derived from source code programs, wherein the neural transformer model with attention includes an attention component and a neural network component, wherein the attention component differs from the neural network component, wherein the attention component relates different positions of an input sequence given to the neural transformer model with attention in terms of queries Q, keys K, and values V;

train the neural transformer model with attention to learn to generate a method body given a method signature by fine-tuning the neural transformer model with attention on a plurality of translation tasks, wherein each translation task uses an input sequence comprising one or more of an input docstring, an input method body, or an input method signature for the neural transformer model with attention to learn to generate an associated method body, an associated method signature, an associated target docstring, or a combination of the associated method body, the associated method signature, and the associated target docstring; and utilize the neural transformer model with attention to predict a target method body, given a specific method signature.

17. The device of claim 16, wherein a select one of the plurality of translation tasks trains the neural transformer model with attention to learn to predict a combination of a method signature and a corresponding docstring given a corresponding method body.

18. The device of claim 16, wherein a select one of the plurality of translation tasks trains the neural transformer model with attention to learn to predict a combination of a method signature and a corresponding method bodygiven a corresponding docstring.

19. The device of claim 16, wherein a select one of the plurality of translation tasks trains the neural transformer model with attention to learn to predict a combination of a docstring and a corresponding method body given a corresponding method signature.

20. The device of claim 16, wherein a select one of the plurality of translation tasks trains the neural transformer model with attention to learn to predict a docstring given a corresponding method signature, corresponding method body, and combination of a corresponding docstring with the corresponding method body.

* * * * *